United States Patent [19]
Simon et al.

[11] 4,023,192
[45] May 10, 1977

[54] SHUTTER MECHANISM

[75] Inventors: Horst Simon; Heinz G. Bethmann, both of Fellbach, Germany

[73] Assignee: Eastman Kodak Company, Rochester, N.Y.

[22] Filed: Feb. 9, 1976

[21] Appl. No.: 656,484

[30] Foreign Application Priority Data
Feb. 21, 1975 Germany .......................... 2507431

[52] U.S. Cl. ................................ 354/147; 354/246
[51] Int. Cl.² ........................................ G03B 15/03
[58] Field of Search ........................... 354/147, 246

[56] References Cited
UNITED STATES PATENTS
3,974,511  8/1976  Matsumoto ....................... 354/147

Primary Examiner—John Gonzales
Attorney, Agent, or Firm—T. H. Close

[57] ABSTRACT

An improved shutter mechanism of the sliding blade-type for synchronizing the firing of a flash device with the movement of one of the shutter blades to effect an exposure. During movement of the blade, an abutment surface on the blade momentarily closes the contacts of a switch to activate an electrically-fired flash device. A second abutment surface, located on either the shutter blade or a cover blade, prevents closing of the switch contacts during recocking of the shutter mechanism.

6 Claims, 2 Drawing Figures

SHUTTER MECHANISM

BACKGROUND OF THE INVENTION

1. Field of the Invention

The invention relates to photographic cameras having shutter mechanisms of the sliding blade-type and, more particularly, to cameras wherein the activation of an electrically-fired flash device is synchronized with movement of one of the shutter blades.

2. Description of the Prior Art

Shutter mechanisms of the sliding blade-type wherein the length of an exposure is determined by linearly guided shutter members are well known to the art. For example, U.S. Pat. No. 3,200,723, entitled "Shutter Timing Apparatus", discloses a shutter mechanism of this type which employs two blades. The first blade moves from a light blocking to a light unblocking position to initiate an exposure while the second blade moves from a light unblocking position to a light blocking position to terminate the exposure. Another shutter mechanism of the sliding blade-type which is well known in the art uses the continuous movement of a single shutter blade from a first light blocking position, through a light unblocking position, to a second light blocking position. A second or cover blade is provided to prevent the entry of light into the camera during recocking of the first shutter blade.

Many different types of devices are also known for synchronizing the actuation of a flash device with the movement of a shutter blade. For example, U.S. Pat. No. 2,960,922, entitled "Flash Synchronizing Device for Cameras"—discloses the use of a conductive first shutter element or opening blade to activate a flash firing circuit. As the opening blade moves from its light blocking position to its light unblocking position, a portion of the blade contacts a resilient conducting member thereby completing the flash firing circuit. Movement of a second shutter element or closing blade, from a light unblocking position to a light blocking position, breaks the contact between the first blade and the resilient conducting member by forcing the resilient conducting member away from the first shutter element. During recocking of the shutter mechanism, the second shutter element keeps the resilient conducting member separated from the first shutter element until the first shutter element can no longer contact the resilient conducting member.

The problem with the above described prior art flash synchronization devices is that the contacts remain closed longer than necessary and thereby unnecessarily load the power supply if the flash device happens to drain power after flashing.

SUMMARY OF THE INVENTION

Accordingly, it is an object of the present invention to provide a simple and yet effective mechanism for actuating a flash sunchronizing circuit during only a desired momentary interval of the shutter actuating cycle and to ensure that the circuit remains open at all other times.

The above, and other, objects are achieved in the preferred embodiment of the present invention herein described by providing, in a camera of the type having a shutter member movable from a cocked to an uncocked position to effect an exposure, a switch adapted to be momentarily closed in synchronization with movement of the shutter member. Momentary closure of the switch by movement of the shutter member from its cocked to its uncocked position activates an electrically operated flash device. Provision is made for preventing closure of the switch when the shutter member moves from its uncocked to its cocked position.

The invention and its objects and advantages, will become more apparent in the detailed description of the preferred embodiments presented below.

BRIEF DESCRIPTION OF THE DRAWING

In the detailed description of the preferred embodiments of the invention presented below, reference is made to the accompanying drawing, in which.

DESCRIPTION OF THE PREFERRED EMBODIMENTS

Because shutter mechanisms of the sliding blade type are well known, the description of the present invention will be directed in particular to elements forming part of, or cooperating more directly with, apparatus in accordance with the present invention. It is to be understood that shutter elements not specifically shown or described may take various forms well known to those skilled in the art.

Figure 1:
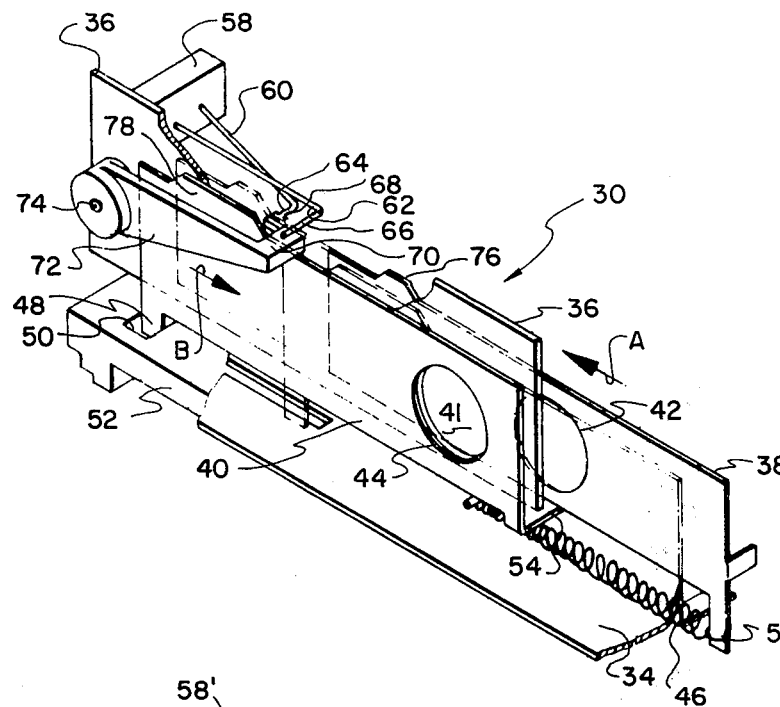
FIG. 1 is a perspective view, partially cutaway, of a shutter mechanism showing one embodiment of the present invention.
Figure 2:
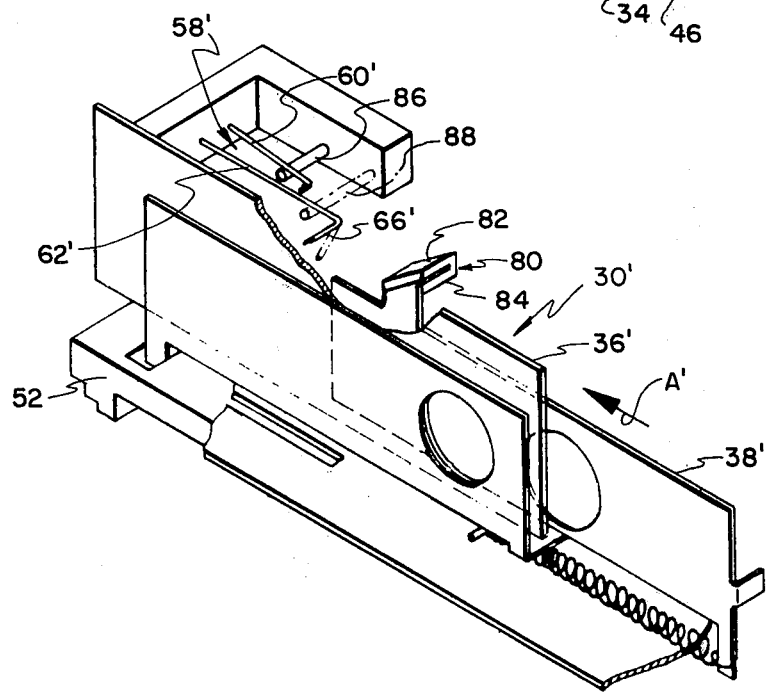
FIG. 2 is a perspective view, partially cutaway, of a shutter mechanism showing another embodiment of the present invention.

In FIGS. 1 and 2, improved apparatus, in accordance with the present invention, are shown for synchronizing the firing of an electrically fired flash device with the movement of a sliding shutter member. The apparatus shown in FIGS. 1 and 2 are characterized in that only one shutter member is used to determine the length of the exposure and the contacts of the switch are closed only during a portion of the exposure sufficient to ensure proper activation of the electrically fired flash device.

The apparatus, as shown in FIG. 1, is comprised of a shutter mechanism 30 mounted within a camera housing, a portion of which, designated 34, is shown. The shutter mechanism 30 is comprised of a mechanism plate 36 for supporting a movable shutter member 38 and a movable covering member 40. An opening 41 is provided in the plate 36 to allow light rays to pass through an opening (not shown) in the camera housing 34, through a lens structure (not shown) onto film (not shown) contained within the camera housing 34. The shutter member 38 has an opening 42 which sequentially passes the opening 41 to allow exposure of film as the shutter member 38 moves from a cocked to an uncocked position. The length of time required for opening 42 to pass opening 41 determines the length of the exposure. The covering member 40 has an opening 44 which is aligned with the opening 41 during exposure and an opaque portion which blocks the opening 41 during recocking of the shutter mechanism 30. Both members 38 and 40 are guided on mechanism plate 36 so as to be movable in a longitudinal direction. A spring 46 is provided to move the shutter member 38 from its cocked to its uncocked position.

The covering member 40 has a lug 48 at one end that extends into an opening 50 in a winding slider or film advance lever 52. The other end of the covering member 40 has a bent-off portion 54 designed to engage a projection 56 on the shutter member 38.

A switch 58 having two spring-type contact members 60 and 62 with bent-off transversely extending ends 64 and 66, respectively, is attached to the mechanism plate 36. When the switch 58 is closed, the firing of an electrically fired flash device (not shown) is initiated. The ends 64 and 66 rest, under the bias of members 60, 62, at a sufficient distance from each other on steps 68 and 70 respectively of a spacing element 72. The steps 68 and 70 are covered with an electrically insulating layer or the element 72 is constructed of an electrically insulating material. The element 72 comprises a stepped lever pivotally mounted on a pin 74 to the mechanism plate 36. As will be hereinafter described, a cam surface 76 on shutter member 38 alternatively closes and opens the switch 58 during movement of the shutter member 38 and a cam surface 78 on the cover member 40 prevents closing of the switch 58 during recocking of the shutter mechanism 30.

In operation, with the shutter mechanism 30 in its cocked position, actuation of a shutter release member (not shown) releases shutter member 38, for movement, under the influence of spring 46 in the direction of arrow A. At a predetermined time during the movement of the shutter member 38, cam surface 76 engages and raises end 64 of contact member 60 bringing it into contact with contact member 62, thereby closing switch 58 and activating an electrically fired flash device. As the shutter member 38 continues to move in the direction of arrow A, cam surface 76 releases end 64 enabling return movement of the latter to the normal position thereof and thereby opening switch 58. The shape, i.e., the length, of the cam surfce 76 thus determines the amount of time that a battery (not shown) will be connected to the flash device. At the termination of the exposure, the opening 42 is disposed to the left, as viewed in FIG. 1, of the opening 41 in the plate 36. Under these conditions, an opaque portion of the shutter member 38 blocks the opening 41 thereby preventing entry of light into the camera housing 34.

Recocking of the shutter mechanism 30 is accomplished automatically when lever 52 is moved in a direction indicated by arrow B. As lever 52 is moved, the covering member 40 is also moved because of the interaction between lug 48 and opening 50. Shutter plate 38 is also moved because of the engagement of bent-off portion 54 with projection 56. During the initial portion of the recocking cycle, the opaque portion of covering member 40 blocks the opening 41 and cam surface 78 engages the spacing element 72 raising both contact members 60 and 62. Thus, cam surface 76 on shutter member 38 is prevented from engaging end 64 of contact member 60 and raising it into contact with member 62. Inadvertent switch closure is thereby prevented. Upon completion of the recocking operation, the covering member 40 returns to its light unblocking position and the shutter member 38 is retained in its light blocking position by means not shown.

It will be apparent that spacing element 72 could also be designed to raise only contact member 62 thus preventing switch closure during cocking.

Referring now to FIG. 2, another embodiment of the present invention is illustrated. Since the embodiment depicted in FIG. 2 has basically the same construction as the embodiment shown in FIG. 1, the same reference numerals, with primes attached, have been used to indicate the same or similar parts. The difference between the embodiment of FIG. 2 and the embodiment of FIG. 1 is that a single shaped surface 80 on the shutter member 38'; (a) controls the opening and closing of switch 58' during the movement of the shutter member 38' in the direction of arrow A; and (b) prevents inadvertent closing of the switch 58' during recocking of the shutter mechansim 30'. The shaped surface 80 has a first inclined surface 82 and a second inclined surface 84 substantially parallel to and spaced apart from the first surface. Each of the surfaces 82 and 84 is covered with an electrically insulating layer and is oblique to the direction of movement of the shutter member 38'. The switch 58' is comprised of contact members 60' and 62' which rest on non-conducting stops 86 and 88 respectively. During movement of the shutter member 38' to effect an exposure, the first inclined surface 82 engages and lifts an end 66' of the contact member 62' into engagement with the contact member 60' thus closing the switch 58' and ensuring initiation of the flash device in synchronism with the operation of the shutter mechanism 30'. Just prior to the shutter member 38' reaching its uncocked position, the first inclined surface 82 releases the end 66' and the circuit between the battery or voltage source and the initiating circuit of the flash device is interrupted.

During recocking of the shutter mechanism 30' by movement of the lever 52, the end 66' is engaged by the second inclined surface 84 and is deflected downwardly until the shaped surface 80 has passed the contact member 60'. In this manner, closing of the switch 58' is prevented during recocking of the shutter mechanism 30'.

The invention has been described in detail with particular reference to preferred embodiments thereof, but it will be understood that variations and modifications can be effected within the spirit and scope of the invention.

We claim:
1. In a photographic camera of the type having a shutter member movable from a cocked to an uncocked position to effect an exposure, a cover member movable between an uncovering and a covering position, the cover member being moved from its uncovering position to its covering position in synchronization with the shutter member being moved from its uncocked to its cocked position and a switch having contacts adapted to be closed by the shutter member for the purpose of synchronizing the initiation of an electrically operated flash device, the improvement comprising:
   first means carried by the shutter member for momentarily closing the switch during movement of the shutter member from its cocked to its uncocked position and for opening the switch prior to the shutter member reaching its uncocked position; and
   second means for preventing switch closure when the shutter member is moved from its uncocked to its cocked position.
2. The invention of claim 1 wherein the switch is comprised of first and second movable contact members, said first contact member being adapted for movement into contact with said second contact member to effect switch closure;
   wherein said first named means comprises an extension of the shutter member for momentarily engaging said first contact member to move it into contact with said second contact member during a portion of the movement of the shutter member from its cocked to its uncocked position and for releasing said first contact member prior to the shutter member reaching its uncocked position; and wherein said second named means includes an extension on the cover member for moving both of said contact members beyond the reach of said first named means during a portion of the movement of said cover member from its uncovering position to its covering position.

3. The invention of claim 2 further comprising:

a shutter plate for guiding the movement of the shutter member and the cover member; and a support element, having a stepped end, pivotally mounted on said shutter plate, said movable contact members being urged towards engagement with said stepped end of said support element, said support element being engageable by the extension on the cover member to cause movement of said movable contact members away from said extension on said shutter member.

4. The invention of claim 1 wherein the switch is comprised of first and second movable contact members, said first contact member being adapted to be moved into contact with said second contact member to effect switch closure, and wherein the improvement further comprises a ramp-like projection on said shutter member having a top surface and a bottom surface, said surfaces being oblique to the direction of movement of said shutter element, said top surface comprising said first named means and said bottom surface comprising said second named means.

5. In a photographic camera, an apparatus for synchronizing the firing of an electrically fired flash device with the movement of a shutter member from a cocked light-blocking position through a light-unblocking position to an uncocked light blocking position to effect an exposure, said appartus comprising:

the shutter member;

a cover member movable from a light unblocking position to a light-blocking position in synchronization with the movement of said shutter member from its uncocked to its cocked position;

switch means for activating the flash device, said switch means comprising first and second normally spaced apart movable contact members, said first contact member being adapted to be moved into contact with said second contact member to effect closure of said switch means;

closure means carried by said shutter member for momentarily moving said first contact member into contact with said second contact member during a portion of the movement of the shutter member to affect the exposure, said closure means allowing return of the first contact member to its normal position when the shutter member is in its uncocked position; and means carried by said cover member for causing movement of said first contact member away from engagement with said closure means during a portion of the movement of the shutter member from its uncocked to its cocked position.

6. In a camera having synchronizing means for electrically firing a flash device in synchronization with the movement of a shutter member from a cocked to an uncocked position to effect an exposure, the improvement wherein said synchronizing means comprises:

switch means for activating the flash device;

first means carried by said shutter member for momentarily closing said switch means during the movement of the shutter member from its cocked to its uncocked position and for opening said switch means when said shutter member is in its uncocked position; and second means carried by said shutter member for preventing closure of the switch means during the movement of the shutter member from its uncocked to its cocked position.

* * * * *